(No Model.)

C. TRERWILER & T. BAST.
TWO WHEELED VEHICLE.

No. 276,309. Patented Apr. 24, 1883.

WITNESSES
F. U. Adams
C. C. Poole

INVENTORS
Charles Trerwiler
Theodor Bast
per W. E. Dayton
Attorney

N. PETERS, Photo-Lithographer, Washington, D. C.

UNITED STATES PATENT OFFICE.

CHARLES TRERWILER AND THEODOR BAST, OF HENNEPIN, ILLINOIS, ASSIGNORS TO FRANK P. LAWRENCE, OF RACINE, WISCONSIN.

TWO-WHEELED VEHICLE.

SPECIFICATION forming part of Letters Patent No. 276,309, dated April 24, 1883.

Application filed November 22, 1882. (No model.)

*To all whom it may concern:*

Be it known that we, CHARLES TRERWILER and THEODOR BAST, of Hennepin, in the county of Putnam and State of Illinois, have invented certain new and useful Improvements in Road-Carts or Two-Wheeled Vehicles; and we do hereby declare that the following is a full, clear, and exact description thereof, reference being had to the accompanying drawings, and to the letters of reference marked thereon, which form a part of this specification.

This invention relates to improvements in road-carts or two-wheeled vehicles; and it consists in certain features of construction hereinafter set forth and claimed.

Figure 1:
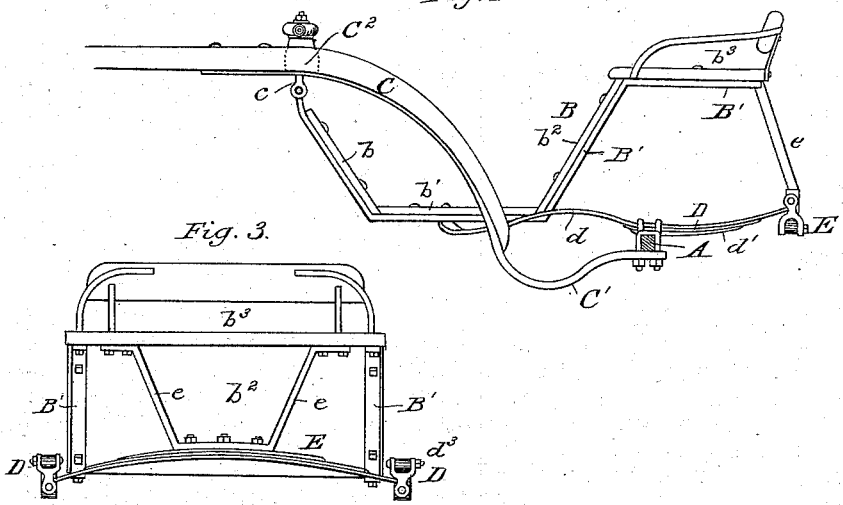
Figure 3:
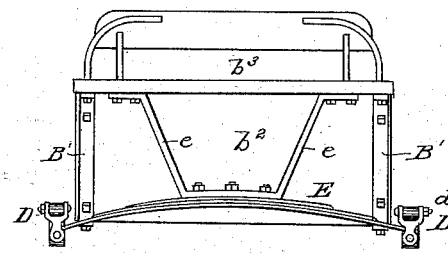
Figure 2:
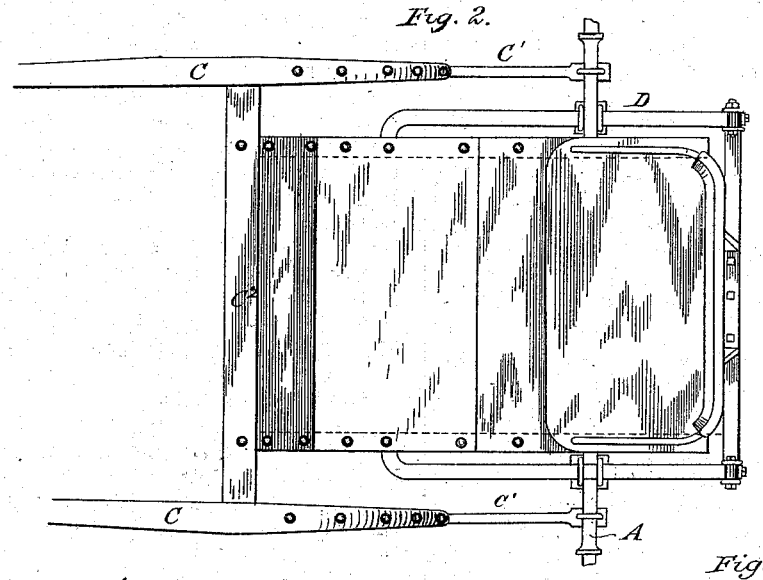
Figure 5:
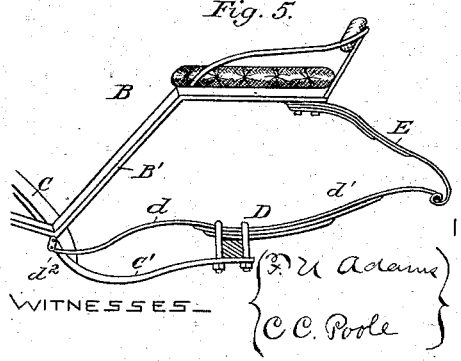
Figure 4:
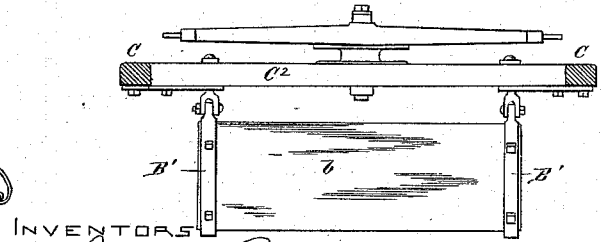

In the drawings, Figure 1 is a side elevation of our improved vehicle with the near wheel detached. Fig. 2 is a plan view without the wheels. Fig. 3 is a rear elevation, and Fig. 4 a front elevation, of parts, showing the connection of the body with the cross-bar of the thills. Fig. 5 is a side elevation of a modified construction of the rear body-springs.

A is the axle, B the body, C the thills, D the side springs, and E the rear springs, of the vehicle. Said body consists of two marginal bent frame-bars, B', preferably of iron, shaped to support the transverse dash $b$, foot-board $b'$, rear board, $b^2$, and seat $b^3$ in proper relation, substantially as shown, said parts being bolted to the frame-bar B' at suitable intervals to secure them in place. The front end of the frame-bars terminate in eyes, which connect by horizontal and transverse bolts to the eye-bolt $c$, inserted through the cross-bars $C^2$ of the thills. Said thills are bent at their rear ends to give proper elevation at the cross-bar, as plainly shown in Fig. 1, and are rigidly connected with the axle by the thill-irons C'. The side springs, D, consist of the manifold rear part, $d'$, and the lighter or single-leaf front part, $d$, the latter being fastened at its extremities to the body B. One mode of securing the front ends of the side springs to the body is shown in Figs. 1 and 2, wherein said front ends of the springs are bent inward and carried beneath the frame-bar B' and bolted thereto by a vertical bolt. Another mode for making this connection of the springs with the body is shown in Fig. 5, wherein the front end of the side springs is secured to the body by the pivotal link $d^2$. The rear springs may be either of the construction shown in Fig. 3, consisting of a transverse manifold leaf-spring connected with the downwardly-directed brace-irons $e$ and joined by the usual hinging devices, $d^3$, common for the connection of platform-springs, or as shown in Fig. 5, wherein curved manifold leaf-springs are shown arranged in the same planes with the side springs and secured to the frame-bar B' at their rear ends beneath the seat.

In the construction of the cart, as described, the rigid body of the vehicle has a vertically-vibrating motion on the pivoted connections $c$ at the cross-bar $C^2$ of the thills, and is yieldingly supported by the several springs, as set forth.

We claim as our invention—

1. In a road-cart, the combination, with an axle and thills attached thereto, of the body B, flexibly joined to the thills at its front end, the side springs, D, secured to the axle, and a spring or springs, E, connecting the rear ends of the side springs with the rear end of the body, substantially as described.

2. The combination, with the axle, thills, and body, the latter flexibly joined to the thills, of the side springs, D, having their front ends bent inward to join with the body, and a rear spring or springs connecting the rear ends of the side springs with that of the body, substantially as described.

In testimony that we claim the foregoing as our invention we affix our signatures in presence of two witnesses.

CHARLES TRERWILER.
    THEODOR BAST.

Witnesses:
  WM. H. CASSON,
  JEFF DURLEY.